US008267831B1

(12) United States Patent
Olsen et al.

(10) Patent No.: US 8,267,831 B1
(45) Date of Patent: Sep. 18, 2012

(54) METHOD AND APPARATUS FOR WASHING, ETCHING, RINSING, AND PLATING SUBSTRATES

(75) Inventors: Gerald L. Olsen, Bodega Bay, CA (US); Lee Ping Huang, Kuching (MY); Leslie Ramsay Betin, Kuching (MY)

(73) Assignee: Western Digital Technologies, Inc., Irvine, CA (US)

( * ) Notice: Subject to any disclaimer, the term of this patent is extended or adjusted under 35 U.S.C. 154(b) by 677 days.

(21) Appl. No.: 12/468,802

(22) Filed: May 19, 2009

(51) Int. Cl.
*F16H 3/44* (2006.01)

(52) U.S. Cl. ........................................................ 475/269

(58) Field of Classification Search .................. 475/207, 475/220, 221, 269, 271, 317, 330, 331
See application file for complete search history.

(56) References Cited

U.S. PATENT DOCUMENTS

| | | | | |
|---|---|---|---|---|
| 1,453,419 | A | 5/1923 | Thompson et al. | |
| 1,475,937 | A | 12/1923 | Daniels | |
| 2,211,295 | A | 8/1940 | Searles et al. | |
| 2,244,197 | A | 6/1941 | Hessler | |
| 2,979,452 | A | 4/1961 | Ludwig et al. | |
| 3,304,138 | A | 2/1967 | Sampatacos | |
| 3,607,712 | A | 9/1971 | Barton et al. | |
| 3,640,592 | A | 2/1972 | Howe, Jr. | |
| 3,880,480 | A | 4/1975 | Anderson | |
| 4,105,310 | A | 8/1978 | Hirata et al. | |
| 4,311,111 | A | 1/1982 | Inaba | |
| 4,324,441 | A | 4/1982 | Rouverol et al. | |
| 4,344,657 | A | 8/1982 | Borel | |
| 4,516,523 | A | 5/1985 | Knox | |
| 4,581,260 | A | 4/1986 | Mawla | |
| 4,750,420 | A | 6/1988 | Shriver | |
| 5,174,045 | A | 12/1992 | Thompson et al. | |
| 5,176,456 | A | 1/1993 | Takebayashi et al. | |
| 5,264,256 | A | 11/1993 | Wozniak, Jr. et al. | |
| 5,358,460 | A | 10/1994 | Vranish | |
| 5,692,575 | A * | 12/1997 | Hellstrom | 173/216 |
| 5,716,147 | A | 2/1998 | Cook et al. | |
| 5,750,207 | A | 5/1998 | Hammond et al. | |
| D411,176 | S | 6/1999 | Shimazu | |
| 5,951,763 | A | 9/1999 | Knox | |
| 5,997,947 | A | 12/1999 | Burns et al. | |
| 6,056,123 | A | 5/2000 | Niemirowski et al. | |
| 6,065,615 | A | 5/2000 | Uchiyama et al. | |
| 6,089,377 | A | 7/2000 | Shimizu | |
| 6,099,302 | A | 8/2000 | Hong et al. | |
| 6,216,709 | B1 | 4/2001 | Fung et al. | |
| 6,341,935 | B1 | 1/2002 | Tseng | |

(Continued)

OTHER PUBLICATIONS

U.S. Appl. No. 12/371,397 to Calcaterra et al., filed Feb. 13, 2009, 30 pages.

(Continued)

*Primary Examiner* — Justin Holmes

(57) ABSTRACT

An apparatus comprises a gear mechanism for imparting planetary motion about a central axle to a plurality of mandrels used for holding substrates in a process bath. The plurality of mandrels are mounted to a pair of end plates, the mandrels and end plates collectively comprise a carousel that rotates about the central axle. Each mandrel is also capable of selective rotation about their own mandrel axis parallel to the central axle. The substrates are held by the mandrels at their inner apertures.

19 Claims, 9 Drawing Sheets

U.S. PATENT DOCUMENTS

| | | | |
|---|---|---|---|
| 6,370,791 | B1 | 4/2002 | Weaver et al. |
| 6,372,303 | B1 | 4/2002 | Burger et al. |
| 6,528,124 | B1 | 3/2003 | Nguyen |
| 6,550,972 | B1 | 4/2003 | Adolph et al. |
| 6,558,750 | B2 | 5/2003 | Gramarossa et al. |
| 6,568,412 | B2 | 5/2003 | Egashira |
| 6,617,540 | B2 | 9/2003 | Zehavi |
| 6,651,552 | B1 | 11/2003 | Didonato |
| 6,660,104 | B2 | 12/2003 | Thompson et al. |
| 6,663,762 | B2 | 12/2003 | Bleck et al. |
| 6,664,122 | B1 | 12/2003 | Andryuschenko et al. |
| 6,673,216 | B2 | 1/2004 | Pedersen et al. |
| 6,709,563 | B2 | 3/2004 | Nagai et al. |
| 6,840,166 | B2 | 1/2005 | Jeter et al. |
| 6,978,546 | B2 | 12/2005 | Andersson et al. |
| 7,097,749 | B2 | 8/2006 | Donovan, III et al. |
| 7,261,033 | B2 | 8/2007 | Dubuit et al. |
| 7,387,563 | B2 | 6/2008 | Allemann et al. |
| 7,438,126 | B2 | 10/2008 | Dallas |
| 7,488,146 | B2 | 2/2009 | Brunson |
| 7,498,062 | B2 | 3/2009 | Calcaterra et al. |
| 7,569,963 | B2 * | 8/2009 | Caiozza ........................ 310/171 |
| 2005/0263401 | A1 | 12/2005 | Olsen et al. |
| 2005/0274605 | A1 | 12/2005 | Calcaterra et al. |

OTHER PUBLICATIONS

U.S. Appl. No. 60/535,380 to Calcaterra et al., filed Jan. 8, 2004, 30 pages.

Enplate ADP-300(QA) Electroless Nickel Process for General Plating Applications, copyright 2000, Enthone-OMI, Inc., Connecticut.

Office Action dated Jan. 15, 2008 from U.S. Appl. No. 10/853,953, 10 pages.

Office Action dated Apr. 10, 2008 from U.S. Appl. No. 10/853,953, 21 pages.

Office Action dated Sep. 5, 2008 from U.S. Appl. No. 10/853,953, 10 pages.

Notice of Allowance dated Oct. 17, 2008 from U.S. Appl. No. 10/853,953, 6 pages.

U.S. Appl. No. 10/853,953 to Calcaterra et al., filed May 26, 2004, 37 pages.

* cited by examiner

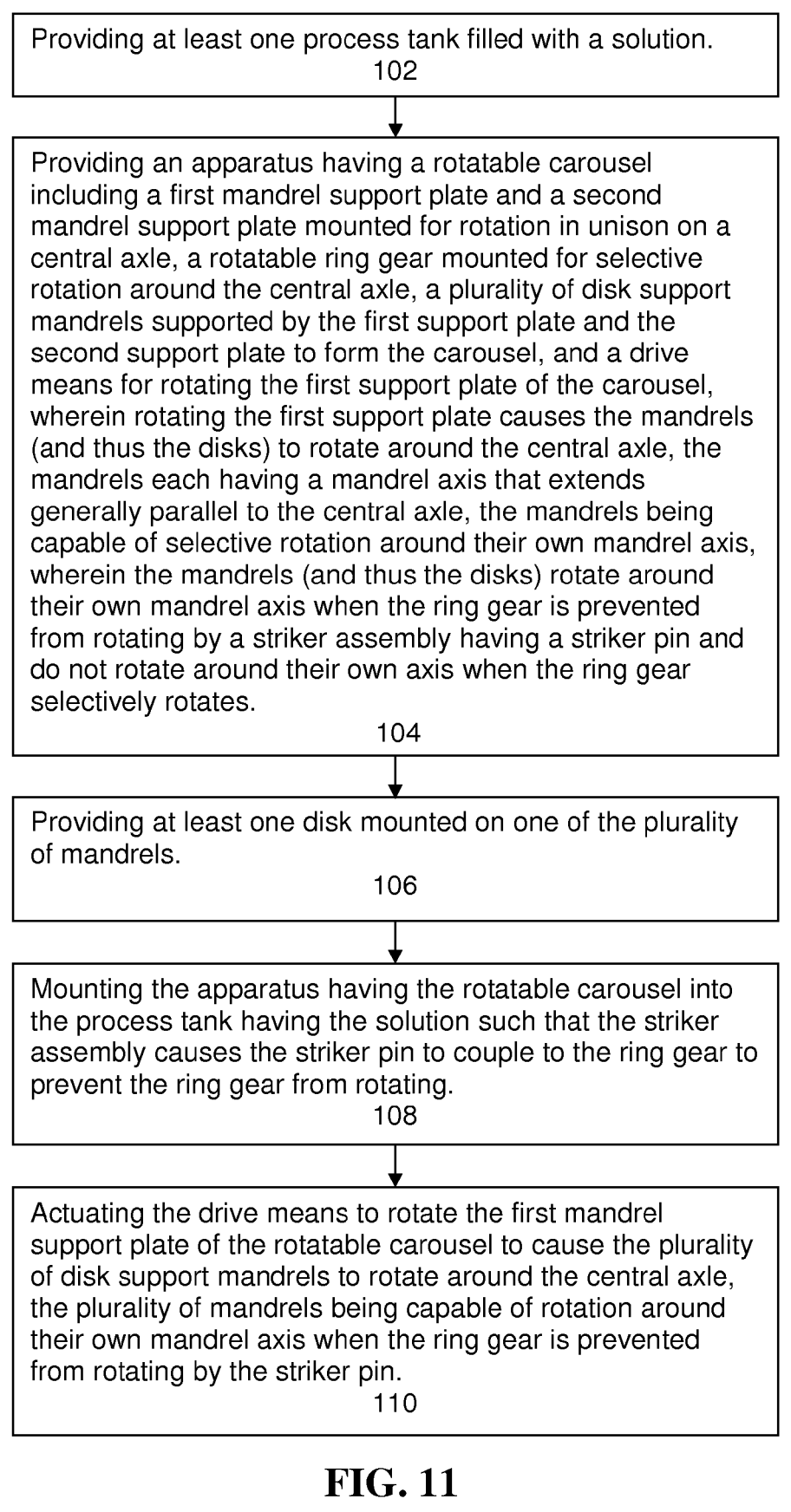

Providing at least one process tank filled with a solution.
102

↓

Providing an apparatus having a rotatable carousel including a first mandrel support plate and a second mandrel support plate mounted for rotation in unison on a central axle, a rotatable ring gear mounted for selective rotation around the central axle, a plurality of disk support mandrels supported by the first support plate and the second support plate to form the carousel, and a drive means for rotating the first support plate of the carousel, wherein rotating the first support plate causes the mandrels (and thus the disks) to rotate around the central axle, the mandrels each having a mandrel axis that extends generally parallel to the central axle, the mandrels being capable of selective rotation around their own mandrel axis, wherein the mandrels (and thus the disks) rotate around their own mandrel axis when the ring gear is prevented from rotating by a striker assembly having a striker pin and do not rotate around their own axis when the ring gear selectively rotates.
104

↓

Providing at least one disk mounted on one of the plurality of mandrels.
106

↓

Mounting the apparatus having the rotatable carousel into the process tank having the solution such that the striker assembly causes the striker pin to couple to the ring gear to prevent the ring gear from rotating.
108

↓

Actuating the drive means to rotate the first mandrel support plate of the rotatable carousel to cause the plurality of disk support mandrels to rotate around the central axle, the plurality of mandrels being capable of rotation around their own mandrel axis when the ring gear is prevented from rotating by the striker pin.
110

FIG. 11

METHOD AND APPARATUS FOR WASHING, ETCHING, RINSING, AND PLATING SUBSTRATES

BACKGROUND

This invention relates to methods and apparatus for washing, etching, rinsing, and plating substrates including electroless plating and electroplating.

In particular, magnetic disks are typically made of an aluminum alloy substrate having an electroless or electrodeposited nickel plate intermediate layer and a surface layer of magnetic read/write material sputtered onto the nickel plate. The nickel plating process involves submersing and agitating the aluminum alloy substrate in a plating bath to electroless plate a nickel-phosphorus alloy layer onto the substrate. Thereafter, the plated substrate may be polished and textured, and one or more underlayers, one or more magnetic layers, and one or more protective overcoats are deposited (e.g. by sputtering) onto the plated substrate.

There are various manufacturing processes utilized for plating substrates. For example, during some processes for making magnetic disks, the disks must be washed, rinsed, plated, and etched clean of foreign contamination of various types. Some of the fluids that are used are caustic and/or harmful to an operator which precludes manual handling during some or all steps of the washing, rinsing, plating or etching process.

For example, in one process, one first submerses, agitates, and soaks substrates in an alkaline cleaner (e.g. a KOH solution plus an inhibitor) in a first tank. Then one rinses the substrates by submersion, agitation, and soaking in a second tank. Next one submerses, agitates, and soaks the substrates in an acidic solution (e.g. phosphoric acid) in a third tank. Next one again rinses the substrates by submersion, agitation, and soaking in the second tank. Finally, the substrates are placed in a plating bath in a fourth tank. This plating bath comprises the chemicals used to plate a nickel-phosphorus alloy (NiP), e.g. nickel sulfates, sodium hypophosphite and chelating agents. The nickel plating chemistry can be a type 300 ADP, manufactured by Enthone Corp. Other plating chemistries are available from OMG Chemistries.

To implement the above processes, it is necessary to move the substrates between four separate tanks. To accomplish this, an entire plating rack and rotatable carousel may be transported between the four separate tanks. Such transportable, immersible, rotatable carousels for washing, etching, rinsing and plating substrates are known in the art.

An apparatus for immersing articles in a violently agitating electroplating bath has been described in detail in U.S. Pat. No. 4,516,523. The apparatus is capable of being immersed in a liquid bath and supports at least two dowels or rods on which are mounted apertured disks in a spaced apart relationship. Each dowel or rod has a gear fixed near one end and has a plurality of axially spaced circumferential grooves in each of which respective apertured disks are disposed. A pair of spaced wheels are provided to rotate in unison about a fixed central axle. Each wheel has a plurality of radially disposed slots into which respective dowels or rods are disposed so that each dowel continuously rotates about its own axis. The central axle supports a fixed sun gear disposed near one wheel and each rod has at one end a planet gear that meshes with the sun gear whenever the respective dowel or rod is nested within a respective pair of slots on the wheels. A motor and a corresponding gear assembly is provided to continuously rotate the pair of wheels and the at least two dowels about the central axle and continuously rotate the at least two dowels or rods about their own axis. However, U.S. Pat. No. 4,516,523 does not describe a continuous rotation of the disks about a central axis and a selective rotation of the disks about their own axis.

Although the apparatus shown and described in U.S. Pat. No. 4,516,523 is generally suitable for electroplating substrates, the apparatus is not shown to be versatile enough to provide optimal performance for each of the washing, etching, rinsing and plating process steps. In particular, the current inventors have found that the ability to provide a continuous rotation of the substrates about a central axis and a selective rotation of the substrates about their own axis allows optimization of the washing, etching, rinsing and plating process steps.

What is needed in the industry is a transportable, immersible, variably-rotatable apparatus that is movable between multiple process tanks and that is capable of providing a continuous rotation of the substrates about a central axis and a selective rotation of the substrates about their own axis which allows optimization of various washing, etching, rinsing and plating process steps.

BRIEF DESCRIPTION OF THE DRAWINGS

FIG. 11 is a block diagram illustrating a method of wetting a plurality of disks using an apparatus having an immersible, rotatable carousel according to one embodiment.

DETAILED DESCRIPTION

Figure 1:
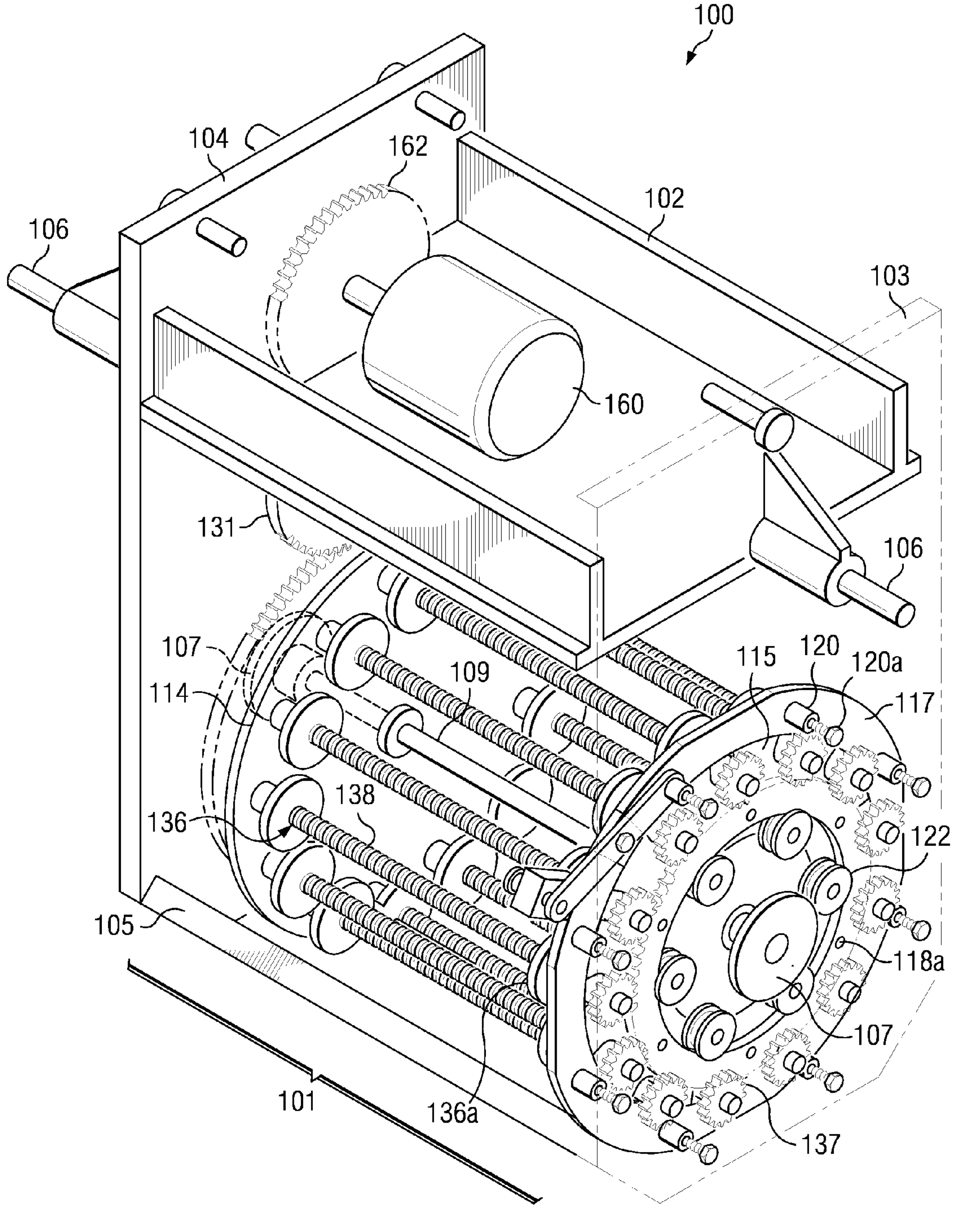
FIG. 1 is a perspective, schematic view illustrating an apparatus having an immersible rotatable carousel according to one embodiment.
Figure 2:
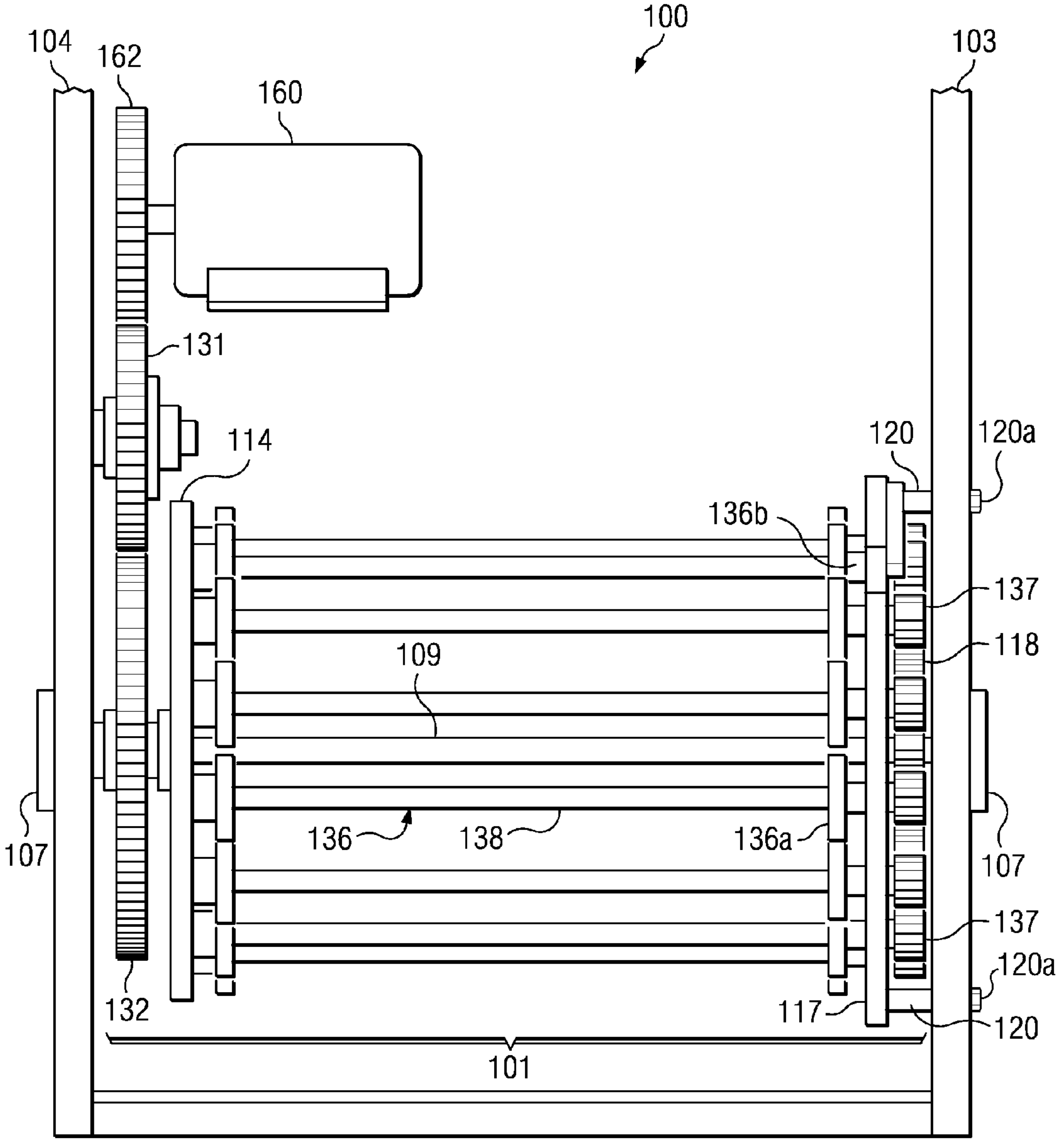
FIG. 2 is a cross section view illustrating an apparatus having an immersible rotatable carousel according to one embodiment.
Figure 3:
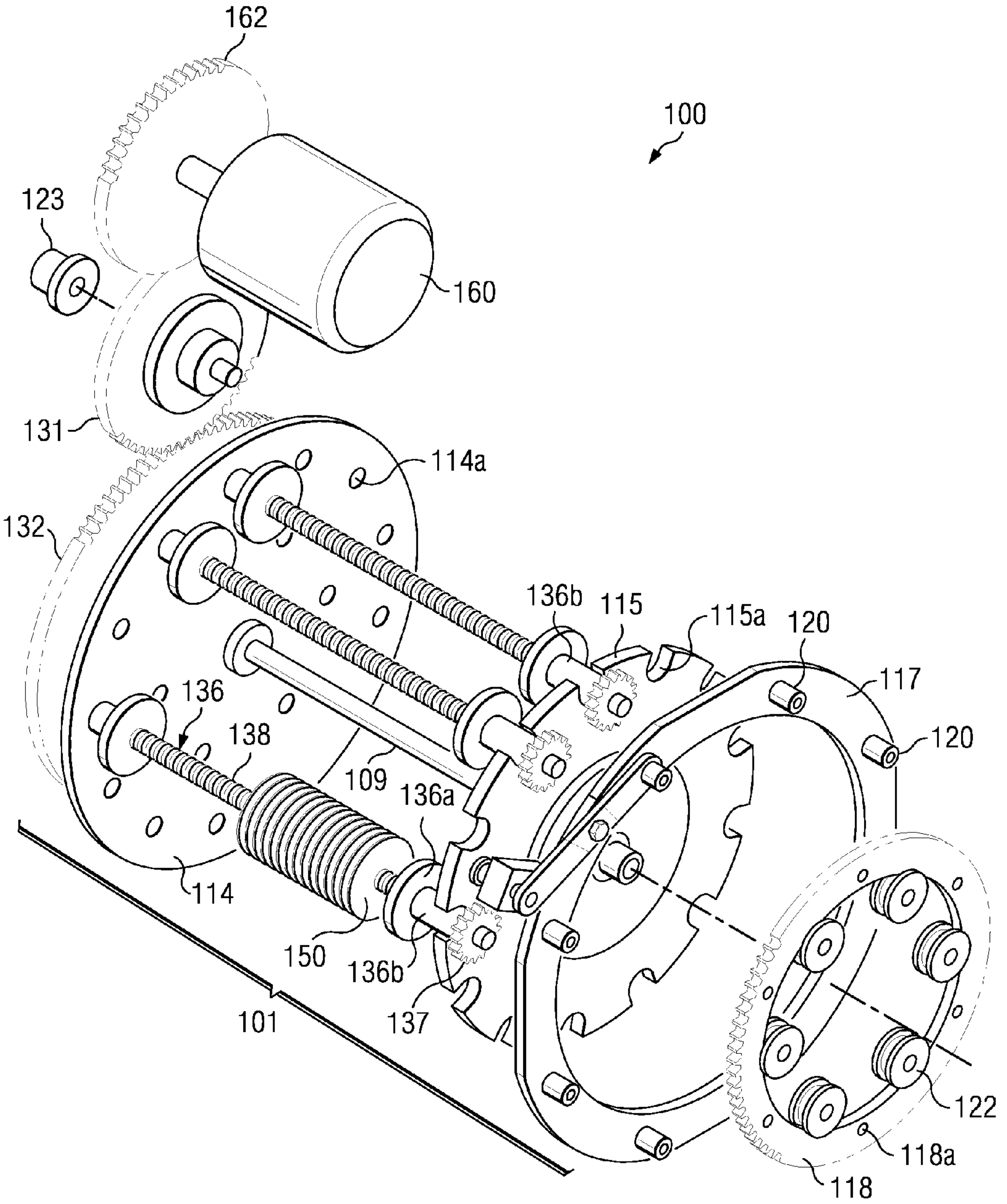
FIG. 3 is a perspective, schematic view illustrating a drive mechanism and an immersible rotatable carousel according to one embodiment.

FIG. 1 illustrates an immersible apparatus 100 for wetting a plurality of disks such as magnetic computer discs in a fluid electroless or electroplating bath. The immersible apparatus 100 may also be immersed in other fluid baths such as cleaning tanks, rinse tanks, etch tanks, etc. The immersible apparatus 100 is comprised of a frame having an immersible lower section defined by a pair of parallel spaced plastic side plates 103, 104 which are held in spaced relationship by one or more transversely extending spacers 105 and a motor plate 102. Referring to FIGS. 2 and 3, a carousel support axle or central axle 109 has a rotatable sun gear 132 coupled to one end of the central axle 109. The central axle 109 is rotatably mounted to side plates 103,104 by way of main shaft support plates 107 and main shaft support bushings 108. The central axle 109 rotates around a central axis. The rotatable sun gear 132 is driven by an electric motor 160 through idle gear 131 and transmission gear 162.

An immersible disk support carousel 101 includes a pair of axially spaced carousel wheels referred to as a first mandrel support plate 114 and a second mandrel support plate 115 that are rigidly mounted on opposite ends of the central axle 109 by appropriate mechanical attachments known to those skilled in the art. The first mandrel support plate 114 may be rigidly mounted to rotatable sun gear 132. Rotation of the sun gear 132 by the motor 160 imparts rotation to the central axle 109 and the disk support carousel 101 including the first mandrel support plate 114 and the second mandrel support plate 115.

The disk support carousel 101, including the first mandrel support plate 114 and the second mandrel support plate 115, also includes a plurality of removable disk support mandrels 136 supported on and extending between the first mandrel support plate 114 and the second mandrel support plate 115. As shown in FIG. 3, the left hand ends of the disk support mandrels 136 are received in a plurality of circumferentially spaced apertures 114*a* in the first mandrel support plate 114. The right hand ends of the mandrels 136 have support bearings thereon which include end flanges 136*a* and bearing/spacers 136*b* which are in turn received in radially extending round bottom recesses 115*a* in the second mandrel support plate 115.

Reception of the opposite ends of the mandrels 136 in the apertures 114*a* and recesses 115*a* permits the mandrels 136 to be removably supported on the spaced apart first mandrel support plate 114 and the second mandrel support plate 115 and to extend in a direction generally parallel to the central axle 109.

Each disk support mandrel 136 is capable of supporting up to 75 apertured disks 150 in a plurality of axially spaced circumferential grooves 138. Rotation of the sun gear 132 by the motor 160 imparts rotation to the central axle 109 and the disk support carousel 101 which in turn imparts planetary rotation to the plurality of disk support mandrels 136.

Figure 7:
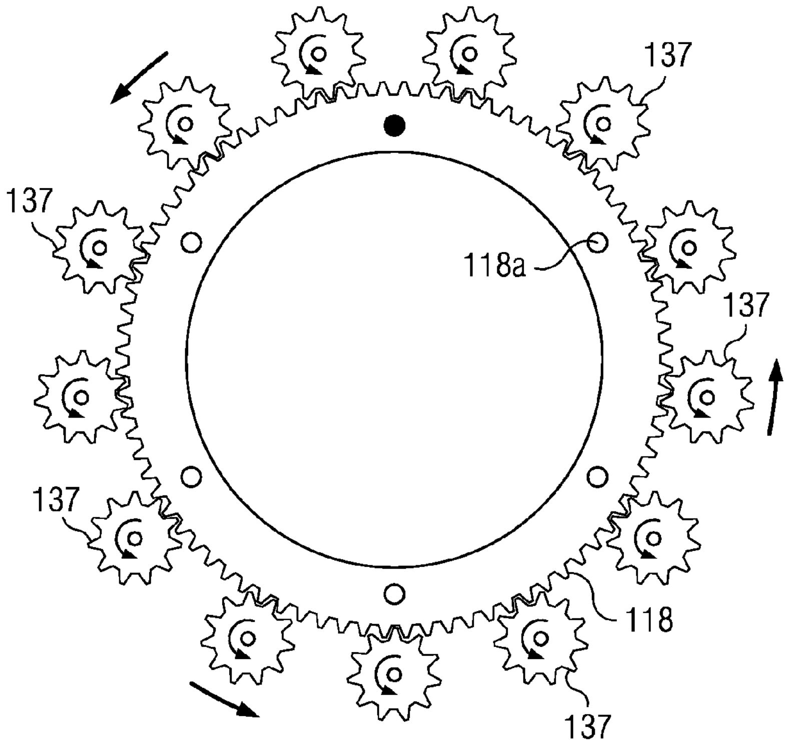
FIG. 7 is a perspective, schematic view illustrating a non-rotating ring gear coupled to a plurality of mandrel gears rotating around a central axis and rotating around their mandrel axis according to one embodiment.

In addition to the planetary rotation of the mandrels 136 about the central axle 109 or central axis, the mandrels 136 (and thus the disks 150) are also capable of selective rotation about their own mandrel axis. Each disk support mandrel 136 has a mandrel gear 137 affixed to one end for engagement with a selectively rotatable ring gear 118. The ring gear 118 is in communication with a plurality of pulleys 122 to enable selective rotation of ring gear 118. The selectively rotatable ring gear 118 may be mechanically prevented from rotation by a striker pin 201 that is insertable into circular apertures 118*a* formed in ring gear 118, see FIG. 4. Referring to see FIG. 7, when ring gear 118 is prevented from rotating by striker pin 201, the plurality of disk support mandrels 136 (and thus the disks 150) can rotate about their own mandrel axis as the disk support carousel 101 rotates about central axle 109 or the central axis. The mandrel gears 137 rotate relative to the fixed ring gear 118.

Figure 8:
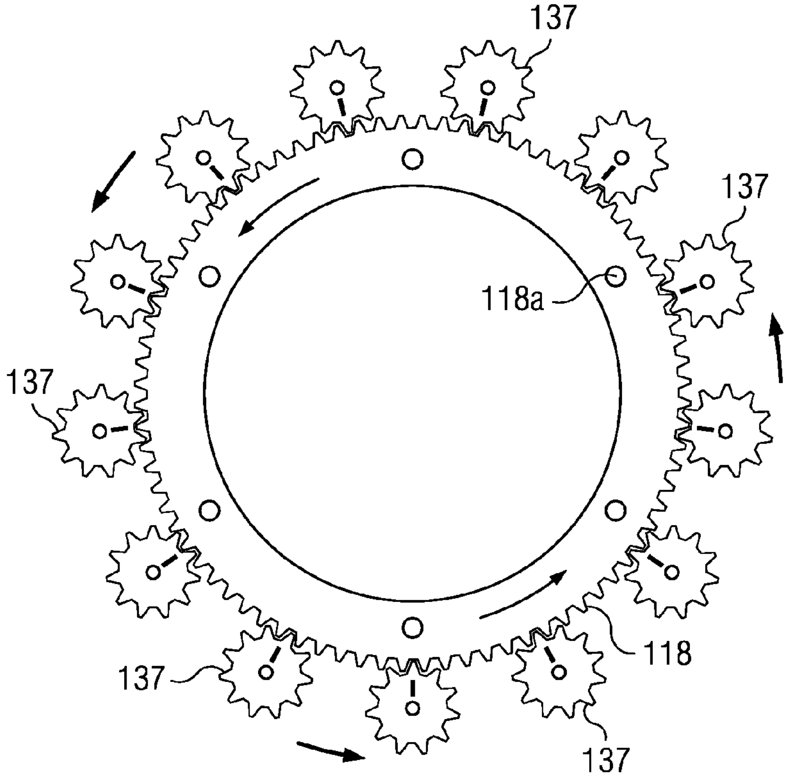
FIG. 8 is a perspective, schematic view illustrating a rotating ring gear coupled to a plurality of mandrel gears rotating around a central axis but not rotating around their mandrel axis according to one embodiment.

On the other hand, referring to see FIG. 8, the disk support mandrels 136 will not rotate about their own mandrel axis when the striker pin 201 is not engaged with the ring gear 118. In this case, the disk support mandrels 136 (and thus the disks 150) do not rotate about their own mandrel axis as the disk support carousel 101 rotates about central axle 109 or the central axis. The rotation of the carousel 101 about central axle 109 causes the mandrel gears 137 to impart rotation to the rotatable ring gear 118.

Figure 4:
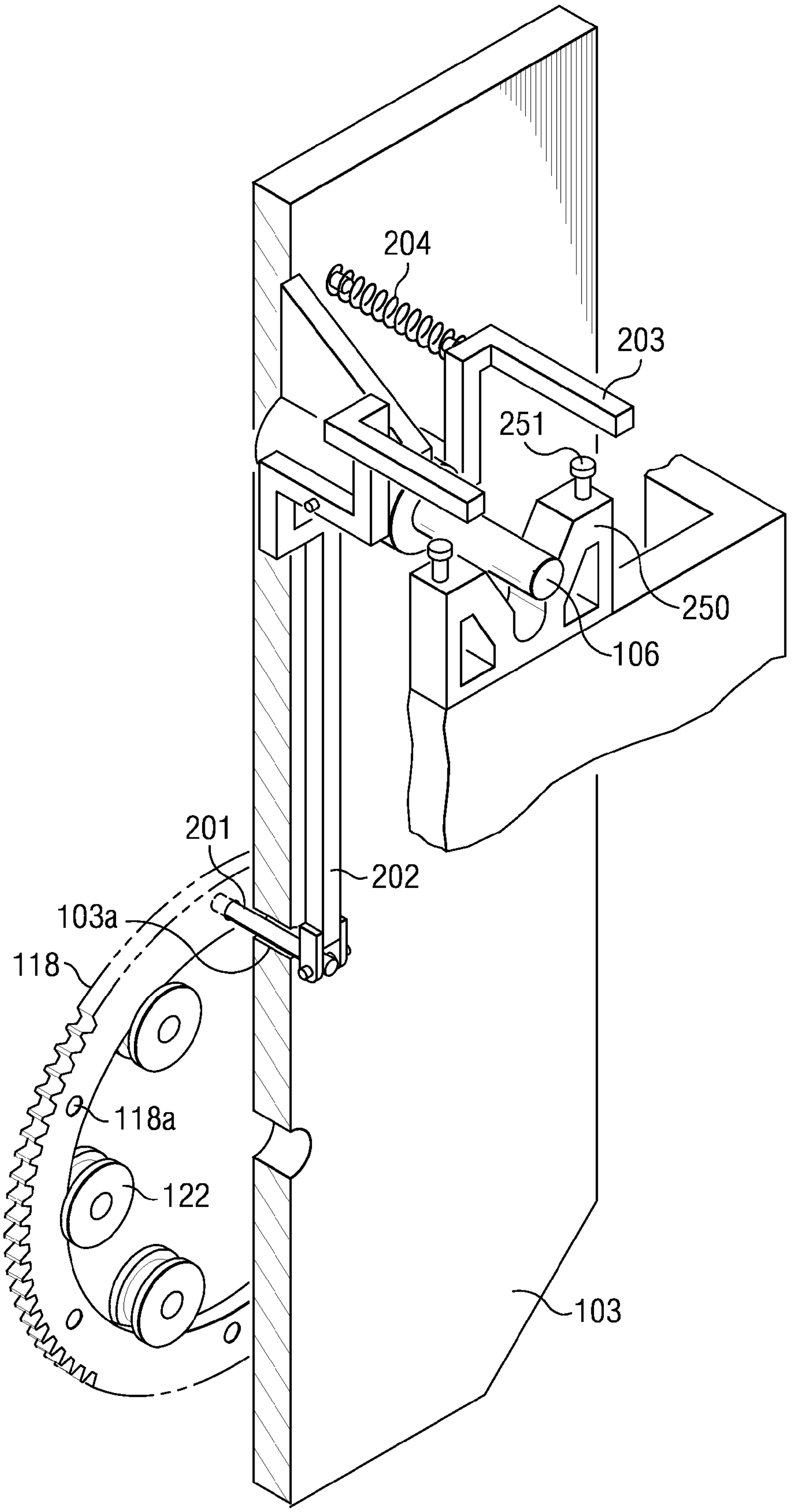
FIG. 4 is a perspective, schematic view illustrating a striker assembly in communication with a ring gear according to one embodiment.
Figure 5:
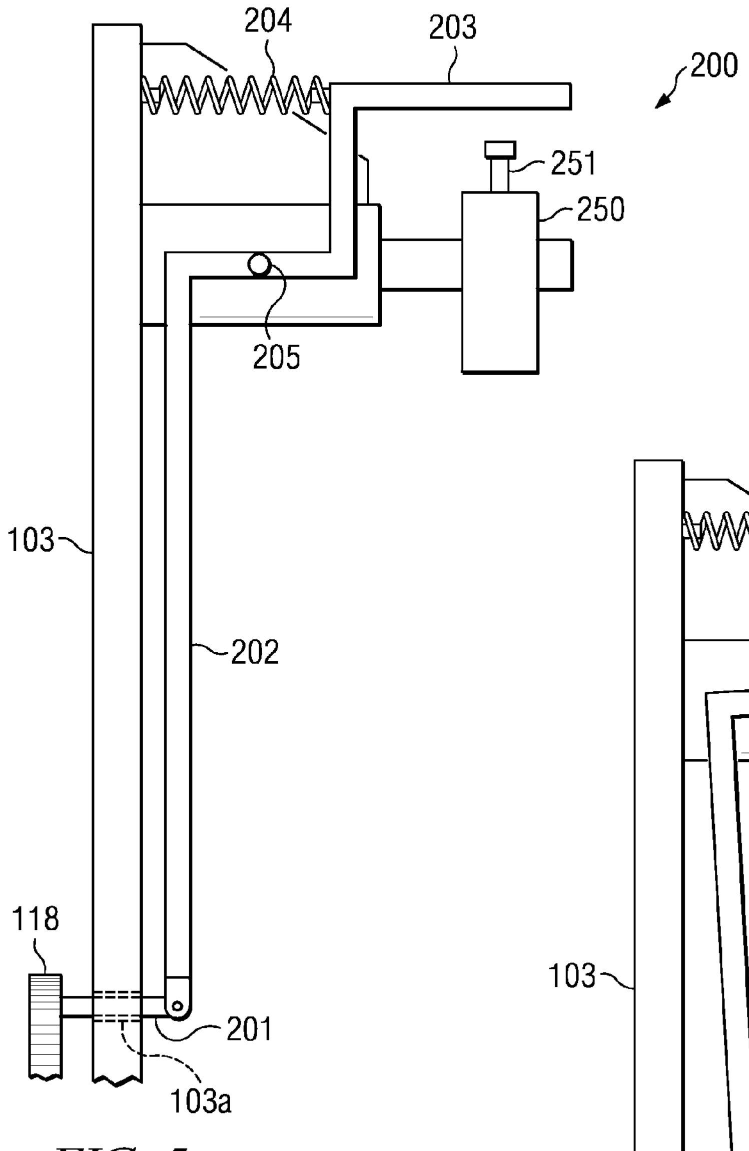
FIG. 5 is a perspective, schematic view illustrating a striker assembly with a striker pin engaged with a ring gear according to one embodiment.
Figure 6:
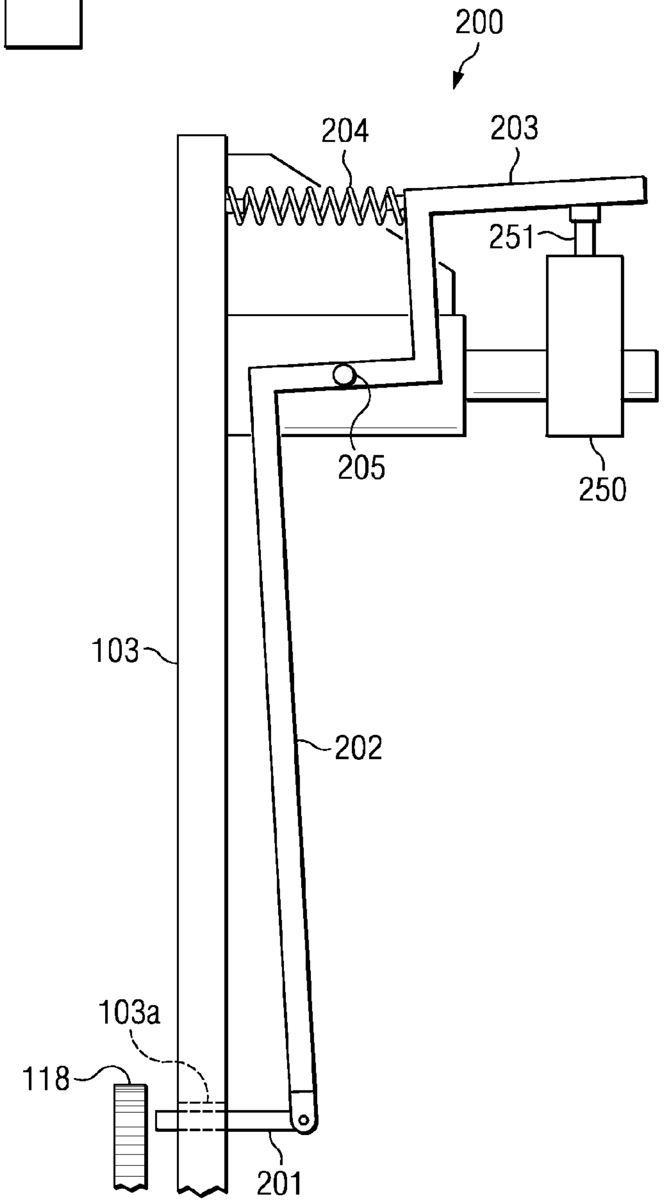
FIG. 6 is a perspective, schematic view illustrating a striker assembly with a striker pin disengaged from a ring gear according to one embodiment.

Referring to FIG. 4, the rotatable ring gear 118 is prevented from rotating by the striker pin 201 when the striker pin 201 is inserted through an aperture 103*a* in the side plate 103 of the frame by a striker assembly 200. Referring to FIGS. 5 and 6, the striker assembly 200 includes the striker pin 201, a lever arm 202, at least one striker arm 203, and a spring 204. To allow rotation of the ring gear 118, the lever arm 202 pivots about a pin 205 when the striker arm 203 is moved in a vertical direction to compress the spring 204, the striker pin 201 attached to an end of the lever arm 202 moves in a substantially horizontal plane and disengages from the ring gear 118, allowing the mandrel gears 137 to impart rotation to the rotatable ring gear 118.

Figure 10:
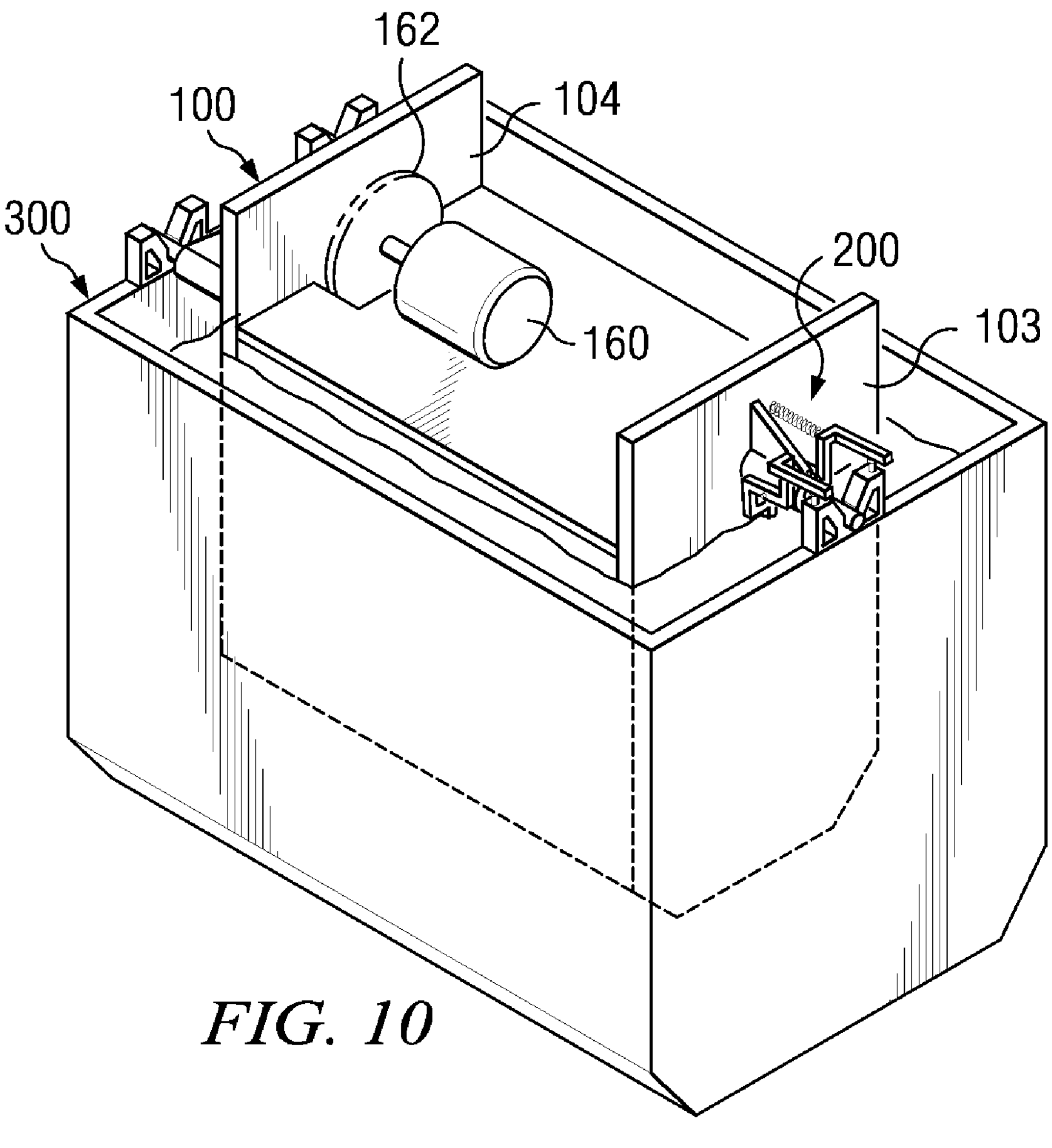
FIG. 10 is a perspective, schematic view illustrating an apparatus having a rotatable carousel immersed in a process tank according to one embodiment.

The striker assembly 200 is actuated when the immersible apparatus 100 is moved to a tank to implement a process that will benefit from having planetary rotation of the mandrels 136 about the central axle 109 or central axis, while not having the mandrels 136 (and thus the disks 150) rotating about their own mandrel axis. As shown in FIGS. 4 and 10, a spacer block 250 with height adjustment screws 251 is positioned on a horizontal shelf of a process tank 300 to actuate the striker assembly 200. Referring to FIG. 10, when the immersible apparatus 100 is positioned in the process tank 300, the height adjustment screws 251 of the spacer block 250 engage the striker arms 203 causing the lever arm 202 to pivot about a pin 205 when the striker arms 203 are moved in a vertical direction to compress the spring 204, the striker pin 201 attached to an end of the lever arm 202 moves in a substantially horizontal plane and disengages from the ring gear 118, allowing the mandrel gears 137 to impart rotation to the rotatable ring gear 118.

Figure 9:
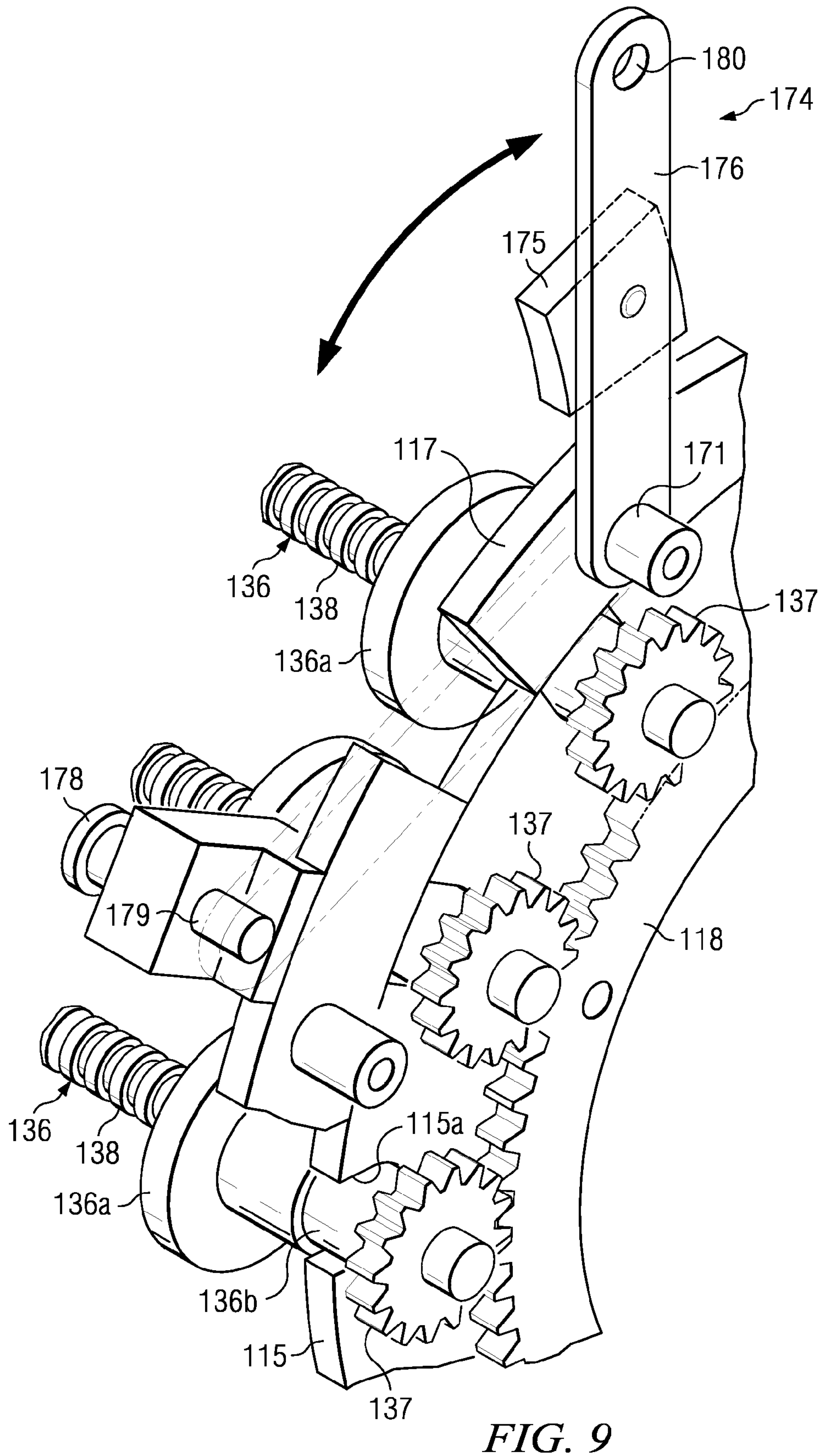
FIG. 9 is a perspective, schematic view illustrating a mandrel keeper mechanism according to one embodiment.

As seen in FIGS. 1, 3, and 9, stationary C-shaped keeper ring 117 substantially surrounds rotatable second mandrel support plate 115 to confine the ends of the mandrels 136 in the radially extending recesses 115*a* during rotation of the carousel 101. The keeper ring 117 is attached by bolts 120*a* and spacers 120 to frame side plate 103. At an upper front accessible portion of the apparatus 100, the keeper ring 117 has a mandrel clearance gap 172 which in turn receives a mandrel keeper gate 174 for opening and closing the gap 172. The gate 174 comprises a block 175 having a concave arcuate surface of slightly larger radius than the radius of the second mandrel support plate 115, the gate block 175 being pivotally affixed to a gate arm 176 which is in turn pivotally affixed to a bolt 171 (or 120*a*) which fasten the C-shaped keeper ring 117 to the frame sideplate 103. Preferably, the gate block 175 is locked in place by a lock in the form of a grippable spring loaded detent pin 178 mounted for movement in the block 174, the pin having an end 179 which is receivable in a hole 180 in the mounting arm 176 to lock the gate block 175 in the mandrel clearance gap 172 in keeper 117.

Although not forming part of the invention, the carousel 101 drive including the motor 160 and transmission gear 162 can be mounted in a fluid-tight immersible housing supported on the upper motor plate 102.

Each of the mandrels 136 is preferably made of a soft plastic such as Teflon and has a plurality of spaced parallel grooves 138 for respectively holding one of a plurality of wettable magnetic discs or other articles to be immersed in a metal electroless or electroplating bath, cleaning bath, rinse bath, etch bath, etc. As the motor 160 and transmission gear

162 rotate the idle gear 131, the idle gear 131 engages the external gear teeth on the sun gear 132 affixed to first mandrel support plate 114 for rotating the entire carousel 101 as a unit. Simultaneously, the planet or mandrel gears 137 on the ends of the disk support mandrels 136 also cause the mandrels 136 (and thus the disks 150) to rotate about their own mandrel axis due to engagement of the gear teeth on the planet or mandrel gears 137 with the external gear teeth on the selectively fixed ring gear 118 (striker pin 201 engaged). Thus, for processes that benefit from rotating mandrels 136 (and thus the disks 150) about their own axis, discs supported for immersion in an electroplating bath, cleaning bath, rinse bath, etch bath, etc are rotated with the mandrels 136 about their own central disk apertures and are further circulated through the agitating bath due to rotation of the carousel 101.

Alternatively, for processes that benefit from not rotating mandrels about their own mandrel axis, the striker pin 201 is disengaged, the ring gear 118 selectively rotates while the mandrel gears 137 and mandrels 136 (and thus the disks 150) do not rotate about their own mandrel axis due to engagement of the gear teeth on the mandrel gears 137 with the external gear teeth on the selectively rotating ring gear 118.

The mandrels 136 may easily be removed to mount and remove apertured discs therefrom by opening the gate 174 which permits one end of a mandrel 136 positioned in gap 172 to be radially removed from its mounting recess 115*a* in second mandrel support plate 115 following which the other end of the mandrel 136 is removed from its aperture 114*a* in the first mandrel support plate 114 by axial movement.

There are multiple manufacturing processes used in electroless or electroplating substrates. For example, during some processes for making magnetic disks, the disks must be washed, rinsed, zincate plated, rinsed, etched, rinsed, nickel-phosphorus plated, and rinsed. To implement the above processes, it is necessary to move the substrates between multiple separate tanks. To accomplish this, an entire plating rack and rotatable carousel may be transported between the multiple separate tanks.

Specifically, to electroless plate a nickel-phosphorus alloy layer (NiP) onto the substrate, a process may, for example, involve a dionized (DI) rinse in tank 1, a zincate plating in tank 2, a dionized (DI) rinse in tank 3, an acid etch in tank 4, a dionized (DI) rinse in tank 5, electroless nickel-phosphorus plating in tank 6, a dionized (DI) rinse in tank 7, etc.

The immersible apparatus 100 is versatile enough to provide optimal performance for each of the washing, etching, rinsing, and plating process steps. In particular, the immersible apparatus 100 can be moved from tank to tank to implement these processes and has the ability to provide a continuous rotation of the disks 150 about a central axle and a selective rotation of the disks 150 about their own mandrel axis to allow optimization of the washing, etching, rinsing and plating process steps.

For example, during conventional plating processes the mandrels (and thus the disks) are rotated about the central axle and the mandrel axis during all three operations (pretreatment, nickel plating and post treatment). In embodiments of the present invention, the mandrels (and thus the disks) rotate relative to the central axle and the mandrel axis before and after nickel plating but are non-rotating relative to the mandrel axis during nickel plating to reduce full surface waviness of the plated nickel. Embodiments of the present invention have demonstrated a reduction in full surface waviness (side-to-side delta) from 4 Angstroms to 1 Angstrom.

FIG. 11 illustrates a method of wetting a plurality of disks 150 using an apparatus having an immersible, rotatable carousel. The method begins with act 102 providing at least one process tank filled with a solution.

Act 104 includes providing the apparatus having the immersible rotatable carousel, the apparatus including a first mandrel support plate and a second mandrel support plate mounted for rotation in unison on a central axle, a rotatable ring gear mounted for selective rotation around the central axle, a plurality of disk support mandrels, the mandrels being supported by the first mandrel support plate and the second mandrel support plate to form the rotatable carousel, and a drive means for rotating the first mandrel support plate of the rotatable carousel, wherein rotating the first mandrel support plate causes the plurality of disk support mandrels (and thus the disks) to rotate around the central axle, the mandrels each having a mandrel axis that extends generally parallel to the central axle, the plurality of mandrels being capable of selective rotation around their own mandrel axis, wherein each of the mandrels having a mandrel gear affixed thereto and the mandrel gears having teeth in meshing engagement with external teeth on the ring gear such that the mandrels (and thus the disks) rotate around their own mandrel axis when the ring gear is prevented from rotating by a striker assembly having a striker pin and do not rotate around their own axis when the ring gear selectively rotates.

Act 106 includes providing at least one disk 150 mounted on one of the plurality of mandrels.

Act 108 includes mounting the apparatus having the rotatable carousel into the process tank having the solution such that the striker assembly causes the striker pin to couple to the ring gear to prevent the ring gear from rotating.

Act 110 includes actuating the drive means to rotate the first mandrel support plate of the rotatable carousel to cause the plurality of disk support mandrels (and thus the disks) to rotate around the central axle, the plurality of mandrels being capable of rotation around their own mandrel axis when the ring gear is prevented from rotating by the striker pin.

It should be appreciated by those with skill in this art that, although embodiments of the invention have been previously described with reference to a particular immersible apparatus, that the embodiments of the invention may be utilized with a wide variety of differing types of immersible apparatuses having different types of disks, wafers, substrates etc., and that the details describing the embodiments of the invention are not intended to limit the scope of the invention as set forth in the appended claims.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

We claim:

1. An apparatus having an immersible rotatable carousel for wetting a plurality of disks which are supported on at least one disk support mandrel, comprising:

a support frame having an immersible section;

a central axle fixedly mounted on said support frame;

a first mandrel support plate and a second mandrel support plate mounted for rotation in unison on said central axle, said first mandrel support plate having a plurality of circumferentially spaced bearing apertures therein, said second mandrel support plate having a plurality of circumferentially spaced radially extending recesses which are circumferentially aligned with said bearing apertures;

a sun gear fixedly mounted to said first mandrel support plate;

a rotatable ring gear mounted for selective rotation on said frame;

a plurality of disk support mandrels each having a first bearing end received in one of said bearing apertures and a second bearing end received in one of said recesses, said mandrels being supported by said first mandrel support plate and said second mandrel support plate to form a rotatable carousel; and drive means for rotating said sun gear attached to said first mandrel support plate of said rotatable carousel, wherein rotating said sun gear causes said plurality of disk support mandrels to rotate around said central axle, said mandrels each having a mandrel axis that extends generally parallel to said central axle, said plurality of mandrels being capable of selective rotation around their own mandrel axis, wherein each of said mandrels having a mandrel gear affixed thereto and said mandrel gears having teeth in meshing engagement with external teeth on said rotatable ring gear such that said mandrels rotate around their own mandrel axis when said ring gear is prevented from rotating and do not rotate around their own axis when said ring gear selectively rotates.

2. The apparatus of claim 1, wherein said rotatable ring gear is mounted for selective rotation on a plurality of pulleys mounted on said frame.

3. The apparatus of claim 1, wherein said rotatable ring gear is prevented from rotating by a striker pin when the striker pin is inserted into an aperture in said rotatable ring gear by a striker assembly to engage said rotatable ring gear.

4. The apparatus of claim 3, wherein said striker assembly includes the striker pin, a lever arm, at least one striker arm, and a spring, wherein the lever arm pivots about a pin when the striker arm is moved in a vertical direction to compress the spring, the striker pin attached to an end of the lever arm moves in a substantially horizontal plane and disengages from the ring gear, allowing said mandrel gears to impart rotation to the rotatable ring gear.

5. The apparatus of claim 1, further including a stationary C-shaped keeper ring attached to said frame and substantially surrounding said second mandrel support plate having said radially extending recesses therein.

6. The apparatus of claim 5, wherein said C-shaped keeper further includes a radially extending gap of width greater than the width of said recesses, said gap being disposed to extend generally upwardly and a moveable gate means for opening and closing said gap to retain said ends of said mandrels in said recesses during rotation of said carousel.

7. The apparatus of claim 6, wherein said gate means comprises a block having a concave arcuate surface of slightly larger radius than the radius of said wheel having said recesses therein, said gate block being pivotally affixed to a support arm and said arm being pivotally mounted on said frame.

8. The apparatus of claim 7, further comprising a gate lock comprising a grippable spring loaded detent pin mounted for movement in said block, said pin being receivable in a hole in said arm for locking said gate block in said keeper gap.

9. The apparatus of claim 1, wherein said frame has a pair of spaced apart end plates and a top plate spanning the end plates.

10. The apparatus of claim 1, wherein drive means includes a motor coupled to a transmission gear.

11. An apparatus having an immersible rotatable carousel for wetting a plurality of disks which are supported on at least one disk support mandrel, comprising:

a first mandrel support plate and a second mandrel support plate mounted for rotation in unison on a central axle;

a rotatable ring gear mounted for selective rotation around said central axle;

a plurality of disk support mandrels, said mandrels being supported by said first mandrel support plate and said second mandrel support plate to form said rotatable carousel; and a drive means for rotating said first mandrel support plate of said rotatable carousel, wherein rotating said first mandrel support plate causes said plurality of disk support mandrels to rotate around said central axle, said mandrels each having a mandrel axis that extends generally parallel to said central axle, said plurality of mandrels being capable of selective rotation around their own mandrel axis, wherein each of said mandrels having a mandrel gear affixed thereto and said mandrel gears having teeth in meshing engagement with external teeth on said rotatable ring gear such that said mandrels rotate around their own mandrel axis when said ring gear is prevented from rotating and do not rotate around their own axis when said ring gear selectively rotates.

12. The apparatus of claim 11, wherein said rotatable ring gear is prevented from rotating by a striker pin when the striker pin is inserted into an aperture in said rotatable ring gear by a striker assembly to engage said rotatable ring gear.

13. The apparatus of claim 12, wherein said striker assembly includes the striker pin, a lever arm, at least one striker arm, and a spring, wherein the lever arm pivots about a pin when the striker arm is moved in a vertical direction to compress the spring, the striker pin attached to an end of the lever arm moves in a substantially horizontal plane and disengages from the ring gear, allowing said mandrel gears to impart rotation to the rotatable ring gear.

14. A method of wetting a plurality of disks using an apparatus having an immersible, rotatable carousel, comprising:

providing at least one process tank filled with a solution;

providing the apparatus having the immersible rotatable carousel, said apparatus including a first mandrel support plate and a second mandrel support plate mounted for rotation in unison on a central axle, a rotatable ring gear mounted for selective rotation around said central axle, a plurality of disk support mandrels, said mandrels being supported by said first mandrel support plate and said second mandrel support plate to form the rotatable carousel, and a drive means for rotating said first mandrel support plate of said rotatable carousel, wherein rotating said first mandrel support plate causes said plurality of disk support mandrels to rotate around said central axle, said mandrels each having a mandrel axis that extends generally parallel to said central axle, said plurality of mandrels being capable of selective rotation around their own mandrel axis, wherein each of said mandrels having a mandrel gear affixed thereto and said mandrel gears having teeth in meshing engagement with external teeth on said rotatable ring gear such that said mandrels rotate around their own mandrel axis when said ring gear is prevented from rotating by a striker assembly having a striker pin and do not rotate around their own axis when said ring gear selectively rotates;

providing at least one disk mounted on one of said plurality of mandrels;

mounting said apparatus having said rotatable carousel into said process tank having said solution such that said striker assembly causes said striker pin to couple to said ring gear to prevent the ring gear from rotating;

actuating said drive means to rotate said first mandrel support plate of said rotatable carousel to cause said plurality of disk support mandrels to rotate around said central axle, said plurality of mandrels being capable of rotation around their own mandrel axis when said ring gear is prevented from rotating by said striker pin.

15. The method of claim 14, wherein said rotatable ring gear is prevented from rotating by a striker pin when the striker pin is inserted into an aperture in said rotatable ring gear by the striker assembly to engage said rotatable ring gear.

16. The method of claim 15, wherein said striker assembly includes the striker pin, a lever arm, at least one striker arm, and a spring, wherein the lever arm pivots about a pin when the striker arm is moved in a vertical direction to compress the spring, the striker pin attached to an end of the lever arm moves in a substantially horizontal plane and disengages from the ring gear, allowing said mandrel gears to impart rotation to the rotatable ring gear.

17. A method of wetting a plurality of disks using an apparatus having an immersible, rotatable carousel, comprising:

providing a first process tank filled with a first solution and a second process tank filled with a second solution;

providing a striker support block in said second process tank;

providing the apparatus having the immersible rotatable carousel, said apparatus including a first mandrel support plate and a second mandrel support plate mounted for rotation in unison on a central axle, a rotatable ring gear mounted for selective rotation around said central axle, a plurality of disk support mandrels, said mandrels being supported by said first mandrel support plate and said second mandrel support plate to form the rotatable carousel, and a drive means for rotating said first mandrel support plate of said rotatable carousel, wherein rotating said first mandrel support plate causes said plurality of disk support mandrels to rotate around said central axle, said mandrels each having a mandrel axis that extends generally parallel to said central axle, said plurality of mandrels being capable of selective rotation around their own mandrel axis, wherein each of said mandrels having a mandrel gear affixed thereto and said mandrel gears having teeth in meshing engagement with external teeth on said rotatable ring gear such that said mandrels rotate around their own mandrel axis when said ring gear is prevented from rotating by the striker assembly having a striker pin and do not rotate around their own axis when said ring gear selectively rotates;

providing at least one disk mounted on one of said plurality of mandrels;

mounting said apparatus having said rotatable carousel into said first process tank having said first solution such that said striker assembly causes said striker pin to couple to said ring gear to prevent the ring gear from rotating;

actuating said drive means to rotate said first mandrel support plate of said rotatable carousel to cause said plurality of disk support mandrels to rotate around said central axle, said plurality of mandrels being capable of rotation around their own mandrel axis when said ring gear is prevented from rotating by said striker pin;

mounting said apparatus having said rotatable carousel into said second process tank having said second solution such that said striker assembly is actuated by said striker support blocks causing said striker pin to uncouple from said ring gear to allow said ring gear to rotate;

actuating said drive means to rotate said first mandrel support plate of said rotatable carousel to cause said plurality of disk support mandrels to rotate around said central axle, said plurality of mandrels do not rotate around their own mandrel axis when said ring gear is rotating.

18. The method of claim 17, wherein said rotatable ring gear is prevented from rotating by a striker pin when the striker pin is inserted into an aperture in said rotatable ring gear by the striker assembly to engage said rotatable ring gear.

19. The method of claim 18, wherein said striker assembly includes the striker pin, a lever arm, at least one striker arm, and a spring, wherein the lever arm pivots about a pin when the striker arm is moved in a vertical direction to compress the spring, the striker pin attached to an end of the lever arm moves in a substantially horizontal plane and disengages from the ring gear, allowing said mandrel gears to impart rotation to the rotatable ring gear.

* * * * *